(12) United States Patent
America

(10) Patent No.: US 7,165,236 B2
(45) Date of Patent: Jan. 16, 2007

(54) METHOD FOR DEVELOPING COMPLEX SYSTEMS

(75) Inventor: Petrus Hubertus Maria America, Eindhoven (NL)

(73) Assignee: Koninklijke Philips Electronics, N.V., Eindhoven (NL)

( * ) Notice: Subject to any disclaimer, the term of this patent is extended or adjusted under 35 U.S.C. 154(b) by 704 days.

(21) Appl. No.: 09/801,602

(22) Filed: Mar. 8, 2001

(65) Prior Publication Data

US 2001/0025236 A1   Sep. 27, 2001

(30) Foreign Application Priority Data

Mar. 9, 2000   (EP)   ................................. 00200856

(51) Int. Cl.
    *G06F 9/44*   (2006.01)
(52) U.S. Cl. .................................................. 717/102
(58) Field of Classification Search ........ 717/101–117, 717/120–123; 707/4; 382/128
    See application file for complete search history.

(56) References Cited

U.S. PATENT DOCUMENTS

| | | | |
|---|---|---|---|
| 6,199,195 B1 * | 3/2001 | Goodwin et al. ........... | 717/104 |
| 6,366,683 B1 * | 4/2002 | Langlotz ..................... | 382/128 |
| 6,550,054 B1 * | 4/2003 | Stefaniak .................... | 717/104 |

OTHER PUBLICATIONS

Saint-Marcel et al., "The Invoicing System in UML", Mar. 26, 1998, IMAG, International Workshop, Nantes.*
Regnell et al., "From Requirements to Design with Use Cases", 3rd Intl Workwhop on Requirements Engineering—Proceeding CAISE '97, Jun. 1997.*
Don Hiem, "Requirements Management with Use Cases" Software Technology Conference, May 1999.*
Ecklund et al., "Change Cases: Use Cases that Identify Future Requirements", Proceedings of the 11th ACM Sigplan conferences, vol. 31 Issue 10.*
Terry Quatrani, "Visual Modeling with Rational Rose and UML", 1998, Addison-Wesley, ch. 12, "Building the Iterations", pp. 159-177.*
Yang et al., "A UML-based object-oriented framework development methodology," Software Engineering Conference, 1998. Proceedings. 1998 Asia Pacific Taipei, Taiwan Dec. 2-4, 1998, Los Alamitos, CA, USA IEEE Comput. SOC, US, Feb. 12, 1998, pp. 211-218.
"A Client/Server Pattern-Oriented Framework for Distributed Medical Image Applications," Internet Document, Nov. 12, 1998, URL:http://msrc.wvu.edu/cmil/ammarproj.html retrieved on Jan. 17, 2002 p. 1, line 12-line 25 & "Netscape-Page Info" Netscape Screenshot, Jan. 17, 2002.
Lu et al., "Object-Oriented Requirements Modeling Based on UML," Technology Of Object-Oriented Languages And Systems, 1999. Tools 31. Proceedings Nanjing, China Sep. 22-25, 1999, Los Alamitos, CA, USA IEEE comput. SOC, US Sep. 22, 1999, pp. 133-140.

* cited by examiner

*Primary Examiner*—Kakali Chaki
*Assistant Examiner*—Tuan Anh Vu

(57) ABSTRACT

A method for developing a family of complex systems having a common software architecture platform. The method entails forming a functional requirements specification (FRS) which includes use cases that describes interaction of users with said complex systems in terms of abstract concept and forming a requirements object model which explains the abstract concepts in terms of a structured vocabulary. The use cases are developed simultaneously with the requirements object model. The FRS specifies the interaction of the complex systems with their users, i.e., the FRS specifies the activities which are performed in the interaction of the complex systems with their users, i.e., 'what' the complex systems do. This is preferably done in terms of the use cases which are usually written in a natural language such as English. The requirements object model specifies the concepts to which the activities specified in the FRS relate.

14 Claims, No Drawings

METHOD FOR DEVELOPING COMPLEX SYSTEMS

The invention relates to a method for developing a family of complex systems having a common software architecture platform.

Such a method for developing a family of complex systems is known from the paper 'Medical product line architectures' by B. J. Pronk in Proceedings of the First IFIP Working Conference on Software Architecture, 1999.

The cited paper discloses a development method for developing diagnostic imaging equipment. The known development method starts from a conceptual architectural view which describes design solutions and rules as applied to tackle the main architectural issues of decomposition vs. co-operation. On top of the conceptual view, additional constructs necessary to realise the system are described as a technical architecture view; in this way the requirements object model is set up. The additional constructs include e.g. I/O—classes, caching mechanisms, operating system and also specific hardware choices.

A goal of the invention is to provide a development method for a family of complex systems that supports simultaneous development of several members of the family as well as later addition of new members.

This goal is achieved by a method for developing the family of complex systems according to the invention the method comprising set up of a functional requirements specification which includes use cases that describes interaction of users with said complex systems in terms of abstract concepts set up of a requirements object model which explains the abstract concepts in terms of a structured vocabulary wherein the use cases are developed hand-in-hand with the requirements object model.

The functional requirements specification (FRS) and the requirements object model together describe a domain, which is defined here as a conceptual space of systems. A domain is defined as a conceptual space of possible systems, which includes the current and future members of the product family. In other words, the specifications and the model should be as much as possible independent of the concrete choices for the individual products to be implemented as members of the family. Thus, the domain is as much as possible independent of particular choices for the individual current and future members of the product family. The essential differences and commonalties of systems within a domain are captured. The requirements object model contains those items necessary to express what happens in the system, but not items relating how things happen in the system. The requirement object model provides a structured vocabulary for the FRS.

The FRS specifies the interaction of the complex systems with their users. Notably, the FRS specifies the activities which are performed in the interaction of the complex systems with their users, i.e. 'what' the complex systems do. This is preferably done in terms of the use cases which are usually written in a natural language such as English. The requirements object model specifies the concepts to which the activities specified in the FRS relate. The FRS may be divided into several chapters. Preferably, the requirements object model is written in an object modeling language such as UML.

Authoring the use cases is done hand-in-hand with the set-up of the requirement object model and the use cases are expressed in the terminology of the requirement object model. This yields clarity and consistency of the functional requirement specification. In particular, an FRS authoring team is established for each chapter of the functional requirement specification (FRS). A single object model control team (OMCT) is responsible for the maintenance of the requirements object model and its internal consistence. The requirement object model is constructed by overlapping modeling teams, each of them comprising an FRS authoring team and the OMCT. Modeling sessions are not overlapping, the authoring work can be done in parallel.

The resulting requirements object model can be used as a starting point for the development of a design object model. The final design object model will then be an extension of the requirements object model. For this to work, the transition from requirements object model to design object model involves a reinterpretation of the model items from conceptual notions into notions at the level of a programming language.

The development method according to the invention achieves an improvement of the traceability in that there is a clear relation between items in the requirements model and in the design model. Notably, the invention makes it possible to trace implementations of specific requirements.

The approach of authoring the use cases hand-in-hand with the set-up of the requirement object model achieves that the development method takes account of future evolution both from a conceptual point of view as generated in the FRS as well as from the point of view of the interactions between systems and users as generated by the requirement object model. In particular, future requirements as foreseen from the requirement object model are also included in the FRS.

The development method according to the invention achieves that owing to the hand-in-hand set-up, the combination of the FRS and the requirement object model are more complete and more accurate. That is, the development method of the invention supplies a complete description of all family members. Notably, completeness and accuracy are improved because any misunderstandings are adequately resolved almost immediately and do not propagate into further stages of the development.

The advantages of having a complete and accurate combination of the FRS and requirements object model also pertain to the development of a single new complex system. That is, the method according to the invention may also be advantageously applied to the development of a single new complex system. A single new complex system may be considered as a family in itself having only a single family member. Moreover, when developing a family of several members, superfluous diversity within the family of complex systems is avoided. The software architecture developed according the method of the invention remains employable when next realisations within the family of complex system are constructed. Notably, the software architecture is again employable when a new or other functionality is added to the present or previous generation of complex system and also when a next generation of complex systems is constructed.

Authoring the use cases hand-in-hand with the set up of the requirements object model is preferably achieved in that the use cases are mainly authored simultaneously with the set up of the requirements object model. It appears that in practice it may be allowed to author a draft version of the use cases before any modeling is done in order to elaborate the use cases in full detail.

It is noted that the concepts of the functional requirements specification and the requirements object model were suggested per se in the book '*Object-oriented Software Engineering: A Use Case Driven Approach*', by Ivan Jacobson et al. (ACM Press/Addison-Wesley 1992). However, there it is taught to first complete the functional requirements specification before set-up of the requirements specification. Moreover, the cited reference concerns development of a software platform for a single complex system.

These and other aspects of the invention will be elaborated with respect to the preferred implementations described herein.

Preferably, the method according to the invention is implemented in that the functional requirements specification includes one or more chapters and one or more FRS authoring teams are established for separate chapters a single object model control team control internal consistency of the requirement object model one or more overlapping modeling teams are formed where each modeling team includes members of the object model control team together with one or more members of respective FRS authoring teams, which overlapping modeling teams for their chapters construct use cases and provide the portions of the structured vocabulary.

While writing the use cases conceptual difficulties and shortcomings of the current requirements object model become apparent and the requirements object model is amended to overcome such shortcomings. Notably, such shortcomings in earlier versions are overcome at an early stage of the set up. Thus, it is avoided that shortcomings persist in next versions where they are often difficult to trace and repair. Further, it is achieved that a lot of domain knowledge is exchanged and shared early in the development method. As the OMCT is involved in all of the overlapping modeling teams the internal consistency of the method is achieved without much additional effort.

Because overlapping modeling teams are employed it is made easier to involve a large number of participants in the development process of the family of complex systems. In particular, tasks may be performed in parallel while internal consistency of the development process is maintained.

Preferably, in one or several of the overlapping modeling teams an initial model is constructed. In this initial construction domain knowledge is shared among the team members. Starting from the initial model use cases are written. Subsequently, in return sessions the model is fine-tuned so as to form a consistent basis of the FRS.

Respective FRS authoring teams are preferably active in parallel for authoring the use cases of respective chapters. Thus, time schedules are relatively easily met. The only possible bottleneck is formed by the OMCT, which is shared by all authoring teams.

These and other examples are elaborated further and discussed by way of example with reference to the embodiments and implementations discussed hereinafter.

In many instances it is a good idea to conceive products to be introduced to the market in the context of a product family, whose members share several internal and external properties. Such a product family approach has many advantages, among others in the areas of marketing, development, manufacturing, and maintenance. During the development of such a family it is important to specify what is to be expected of these products in a sufficiently precise way so that all people involved (from marketing, development, etc.) agree on it without the possibility of significant misunderstandings. This is called the requirements specification. (This is not to be confused with a specification of what is desired unilaterally, e.g., by the marketing department, or a specification of how this is realised.) Note that for a product family the requirements specification should make clear the properties of each individual member of the family while also making explicit what they have in common. Depending on the circumstances such a requirements specification could consist of a single page or of thousands of pages.

Furthermore, from a development point of view, the method according to the invention achieves that a smooth transition is ensured from the requirements specification to the subsequent development phases (design, implementation, etc.). Among others it should be possible to use the documents developed for the requirements specification as a basis for the following phases, without, however, limiting the designers' freedom unnecessarily.

The method according to the invention is suitable for families of complex, software-intensive, electronic products. The following different aspects of the invention will be discussed in detail: the kind of development projects for which it is most suited, the documents that are produced, the way in which it supports product families, the specification process, and the transition to the design phase.

The approach of the invention has been applied, among others, in a large development project for a family of equipment for medical imaging. Medical imaging systems are for example x-ray examination systems, magnetic resonance imaging systems, x-ray computed tomography systems, and diagnostic ultrasound systems. The domain of medical X-ray systems has the following features:

1. The market is relatively mature: Even the relatively modern systems with digital image processing have been around for more than ten years. Consequently, the expectations of the users are very high and to meet those expectations, the systems offer many possibilities to fine-tune them to the precise task at hand. This leads to a high degree of complexity.
2. High demands are placed on the safety and reliability of the equipment. This is one of the reasons why government institutions, such as the American FDA, apply strict rules not only to the equipment itself but even to the development process.
3. The number of systems sold does not run in the millions, but in the thousands. Moreover there are many possible options to configure systems. As a result it rarely occurs that two systems have exactly the same configuration. Therefore it is impossible to test every possible configuration exhaustively.
4. Developing such systems requires the co-operation of many people with vastly different expertise, ranging from VLSI designers to medical application specialists.

The project itself has the features of:
a) It is large, involving over a hundred developers, many of whom were new to the domain.
b) It is carried out jointly by several departments that previously developed their own product lines in relative isolation. As a result the different experts often used different concepts and terminology for comparable things.
c) Although time to market is, of course, important, the complexity of the developed systems nevertheless leads to a project duration of several years. The resulting architecture should have a lifetime of well over ten years.

Because of the above factors, it is clear that an exhaustive and precise specification was necessary as a basis for further development. Specifying the required functionality of complex systems like medical imaging systems in sufficient detail typically involves a large amount of documentation. The method of the invention structures this documentation as follows:

a) The Commercial Requirements Specification (CRS) describes the positioning of the system family members in the market. It only describes their features in very broad terms.
b) The Systems Requirements Specification (SRS) sketches the features of the family members, typically in the form of bulleted lists and tables without much explanation of the terms used.
c) The Functional Requirements Specification (FRS) gives a complete and detailed description of the behaviour of the systems in the family. Most of this is done in the form of use cases: pieces of English text that describe the interaction between the system and its users. Despite its name, the FRS can also contain non-functional requirements, which can either occur in the use cases (e.g., acceptable response times for particular functions) or in a separate chapter. Since the total size of the FRS can be very large, it is often useful to divide the FRS into chapters, so that several authors can work on it in parallel. The method according to the invention proposes to choose the chapters according to areas of functionality, for example, distinguishing different kinds of users or different phases in the user's workflow. For medical imaging systems, examples of chapter titles are Administration, Patient and Beam Positioning, Acquisition, Reviewing, and Archiving. Often these functional areas coincide with areas of expertise for the several FRS authors involved. Note that this subdivision of the FRS does not automatically imply a similar subdivision in the design of the product family.
d) The requirements object model is expressed in UML. This model explains the concepts that play a role in the interaction between the systems and their users and the relationships between these concepts. These concepts can range from concrete, tangible pieces of hardware (e.g., an X-ray detector), via electronic representations of real-world items (e.g., a patient folder) to abstract entities without a counterpart outside a computer (e.g., user preferences). This requirements object model provides a structured vocabulary for the FRS. In other words, all nontrivial words that occur in the use cases should occur in the requirements object model as names of classes, attributes, association roles, etc. Although the FRS is subdivided into chapters, there is a single, shared object model, which provides the common ground that ties the FRS chapters together and ensures that they talk about the same things. The structure of a use case is explained now in some detail. For medical and similar professional electronic equipment, a typical use case involves, only a single user. In most cases this user has a fairly simple interaction with the system (pushing a button, turning a knob, selecting a menu item, etc.), so the sequence of events is not complex enough to justify, for example, a UML sequence diagram. However, the effects, within and around the system, caused by this interaction need to be described very precisely to avoid ambiguity. For example, when increasing the image contrast, it is important to specify precisely which set of images are affected by the change and whether the new contrast will still be effective when the images are viewed next time. This is where the connection with the model comes in as a conceptual framework to interpret these detailed descriptions. In principle, these descriptions could be expressed in a formal language, like OCL, but a natural language such as English is preferred because the specifications should be readable by different kinds of stakeholders, not only software developers. In fact, the goal is to write specifications that can be read as normal English texts by all people that know and agree on the meaning of the terms that are used.

Developing an object model during the requirement specification activity is a novel and inventive element in the method of the invention. According to the invention the use cases are developed hand in hand with the requirement object model combining to a certain degree the requirements specification and analysis activities of other methods. Although writing use cases is not entirely excluded before set up of the requirements object model, the requirements specification is not considered finished until these use cases are expressed in the terminology defined by the requirements object model.

It is noted that the construction of such a requirements object model is not completely comparable to what other methods call analysis. The difference is that often such an analysis is a first step in deciding how to implement the system's functionality, whereas according lo the invention, the requirements model contains just enough information to express what the systems do. This distinction is much clearer than the distinction between analysis and design in the known methods.

The most important advantage of the approach of the invention is a significantly improved clarity and consistency of the FRS. While this could be achieved to a certain degree by including a flat glossary, the additional structure expressed in the object model by indicating the relationships of different items with each other increases this clarity and consistency. For example, if the model indicates that an X-ray system can have more than one X-ray detector, it becomes clear that a use case cannot just mention "the detector" but must indicate which specific detector is meant. Other advantages of the approach will be discussed below in relationship with the modeling and design processes.

Since the method according to the invention result is a design specification of a whole family, rather than of a single system, the specifications reflect that fact. The most important principle is that, as much as possible, the specifications and the model should not describe one or more individual products, but a domain. Hence, the specifications and the model are made independent of the concrete choices for the individual products to be implemented as members of the family. In this way, the specifications and the model form a common basis for the whole product family, stressing the commonalties instead of the differences between the products. This principle is important because it helps to eliminate inessential differences between the products that would otherwise arise naturally, especially when different people are responsible for different products in the family. Nevertheless it is of course necessary to express the possible variation points between the systems in the domain. In the requirements object model these can be represented in the following ways.

a) Specialisation: For a specific system, an object of a class in the model could be a member of a subclass. Whenever this is foreseen, such a subclass can already be included in the model, but this is not necessary. For example, an X-ray detector may be a film detector, a combination of image intensifier and TV camera, a flat solid-state detector, or any other kind of detector that may be invented in the future.
b) Multiplicity: Aggregations or associations in the model can have ranges for their multiplicities. For example, the model may indicate that an X-ray system may contain one or more X-ray detectors, but of course any specific system will have a specific number of detectors.

c) Attributes: A particular system may have a particular value for an attribute of an object in the model, taken from the type of the attribute in the model. For example the maximum resolution and the maximum number of images taken per second may vary among different detectors, even if they are of the same kind.

It is noted however that occurrences of the mechanisms above do not always correspond with system variation points: They could also apply to the data that is maintained by a single system. For example, a patient folder could contain an arbitrary number of study folders, and this number can even change over time within a single X-ray system.

Variations in the use cases between the systems in the domain are such that each system supports its own subset of the use cases. Moreover, the behaviour described in certain use cases may depend on certain parameters, which could differ between the systems. In this case, it is useful to include these parameters in the object model, typically as attributes. More generally, the use cases can depend on several kinds of items in the object model, e.g., the specific class of an object, the number and the identity of the objects involved in an association, or the value of an attribute. (This dependency can also occur if the model item is not related to a variation point between systems in the domain, e.g., a use case could depend on the number of study folders in a patient folder.)

In some cases, the straightforward application of the above mechanisms is not enough, but an in-depth, domain-specific analysis is required to capture the essential differences and commonalties between the systems in a domain. For example, while modeling medical X-ray systems, the method of the invention is applied to the so-called geometry, the subsystem responsible for controlling the major moving parts in the system. The analysis has shown that the essential concepts in the area of geometry were not motors, brakes, and C-arms, but positions and movements. All the systems in the domain shared the same structures for relative positions of X-ray sources, detectors, and patients. On the other hand, two aspects may represent a movement:

What is its clinical purpose? For example, rotating the X-ray beam around the patient, or moving a detector out of the way.

In which way does the user control it? For example, the movement could be performed manually or by a motor.

On the basis of this representation, the geometries of the systems in the domain could be distinguished by which clinical kinds of movements they support and by the control parameters of these movements (e.g., the maximum speed).

When all these measures have been taken, an individual system (possibly a product in the family) can be specified by determining the set of supported use cases and fixing the variation points in the requirements object model (i.e., specifying the subclass in a generalisation, the multiplicities of an association, or the value of an attribute).

During the specification process it may be helpful to consider a small number of specific systems, which may be actual envisaged members of the product family or fictitious ones. By doing this, it is ensured that the abstractions in the FRS and the model actually fit the intended concrete and specific instances. These specific systems can also be included in the model, but in that case they must be clearly marked as examples.

It appears advantageous to involve as many stakeholders as possible in the requirements specification process, since this will increase subsequent acceptance of the specifications. Compared to the CRS and the SRS, the involvement of developers in the FRS and object model will be typically be higher, whereas the involvement of marketing people will typically be lower. For the FRS authoring and object modeling the following team structure has appeared advantageous:

An FRS authoring team for each chapter of the FRS. Such a team will consist of the primary author of the FRS plus a number of supporters, which can be experts in the field or representatives of stakeholders. The responsibilities of this team are to write the FRS chapter and to contribute to the requirements object model.

A single object model control team (OMCT). This team consists of a small number of people (three or four), including at least one person with experience in modeling and possibly a designated scribe. This team does not need much domain knowledge to begin with, since the FRS authoring teams will contribute that. The responsibility of the OMCT is to maintain the object model and to ensure its internal consistency.

Modeling can begin when the people in the FRS team have a good, but informal understanding of the required functionality. Often they have acquired this familiarity by being involved in previous development projects for similar systems. When necessary this understanding can be enhanced by writing and discussing informal use cases In order to obtain a single, consistent object model that provides a basis for all the FRS chapters, the model is constructed by overlapping modeling teams, where each modeling team consists of one FRS authoring team plus the OMCT. The modeling teams may be supplemented by additional experts when needed. Each such group has an initial modeling session, typically lasting one or more weeks, in which the members of the group share their domain knowledge and together construct a piece of the object model (which should be consistent with earlier pieces, of course). Then FRS authoring can begin on the basis of this initial object model and in the following period, return sessions with the OMCT are held, e.g., a half or a full day per week, in order to fine-tune this model.

The typical changes to the model during this fine-tuning fall in the following categories:

a) While writing a use case, it turns out to be difficult with the concepts in the existing model, so the model is changed to solve this problem.

b) A more elegant way has been found to express a certain point in the model.

c) Another modeling group has proposed a change in the model and this must be integrated with the use cases written by the current modeling group.

Modeling outside these modeling teams should be discouraged, since in the subsequent modeling sessions this tends to lead to a discussion about the merits of different solutions, which is more difficult than a discussion about a problem and how to solve it.

In such a time schedule, the OMCT is a shared resource, which could become a bottleneck. In practice this danger can be mitigated by clever and careful planning of the sessions, since typically the people in the FRS teams do not all become available at the same time. However, a strong continuity in the staffing of the OMCT is important, since its members must be familiar with the complete object model and have a reasonable overview of the contents, of the FRS chapters.

The advantage of the above process is that a lot of domain knowledge is exchanged and shared early in the development process, even though only a part of this knowledge can be consolidated in the requirements object model or the FRS. (In any case, this consolidated part is much larger than when working with a flat glossary.) Modeling in overlapping groups has the following advantages:

1. Many people can be involved in the process, which increases the quality, completeness, and acceptance of its outcome.
2. A lot of work (writing the FRS chapters) can be done in parallel.
3. The modeling itself takes place in manageable groups.
4. The overlapping part (the OMCT) can ensure consistency, not only in the contents of the model but also in modeling style.

The requirements specification artefacts described above serve as a solid starting point for the design workflow. One output of the design workflow is a design object model.

The first step towards such a design model is a purely mental one, in which not the model itself, but its interpretation is changed. For example, a UML class in the model represents a (real-world or imaginary) concept when considered in the requirements model, but in the design model the same UML class represents a programming language class. Similarly, an attribute of such a class represents a property of the corresponding concept in the requirements model, but in the design model it stands for a set of access methods and possibly a data member. Of course, this step towards an initial design model does not involve any new artefacts, because the description of the requirements model can simply be reused, but probably because of this, the mental step is a difficult one for many developers and it takes some time to get used to.

The second step towards a design model consist of iteratively doing one of the following:

a) Extension: Adding packages, classes, attributes, operations, etc., as necessary.
b) Subdivision: Grouping classes into packages. (Attributes and operations are already assigned to classes when they are introduced.)
c) Assigning responsibilities: Every package, class, and operation should have a clear and concisely described responsibility.

Of course, these steps are carried-out in order to arrive at a design that is optimised for a product family. Feedback towards the requirements specification process should make sure that in the unlikely case that the requirements cannot be implemented within the constraints of the development project, the FRS and possibly the requirements object model are changed by the FRS authors and the OMCT.

In any case, the result of these steps is a design object model that is a pure extension of the requirements object model. The most important advantage of this is the enhanced traceability: The relationship between the items in the requirements model and the ones in the design model is clear. At first sight, insisting that the requirements model is a pure subset of the design model seems a very strong constraint: While the requirements model is constructed, little or no thought is given to the design, and still the requirements model shapes the design to a significant degree. Nevertheless, the following two principles make sure that the designers have enough freedom to come up with an effective and efficient design:

The requirements object model contains only those items that are necessary to explain what happens in the system. The items related to how things happen (e.g., control and interface classes) do not belong to the requirements model and can therefore be added in complete freedom by the designer.

Responsibilities are not assigned to items in the requirements workflow, but this is left to the design. This again provides the designer with the freedom to assign the responsibilities in a suitable way. For example, when the requirements model says that a class has an attribute, this does not mean that the class also has the responsibility to store the value of that attribute. Instead, the value can be stored somewhere else or computed whenever needed.

As already mentioned above, the method according to the invention was applied and refined in a large development project for a family of X-ray systems. The requirements object model for that project became quite large, containing about 100 diagrams, 700 classes, 1000 relationships and 1500 attributes. This way of requirements modeling and specification laid a solid and stable basis of shared knowledge for further development and that the effort was well spent. Even when the specifications changed somewhat during the project, only minor modifications to the object model were necessary. Several smaller feasibility studies have confirmed that this approach is suitable over a wide range of professional electronic systems.

The invention claimed is:

1. A method for simultaneously developing a family of complex systems, the family having present and future members, the family having a common software architecture platform, the family of complex systems including a plurality of complex systems, the method comprising:
   constructing an initial requirements object model which explains abstract concepts in terms of a structured vocabulary,
   forming an initial set of use cases based on the initial requirements object model such that the use cases are expressed using the structured vocabulary of the requirements object model, the use cases describing interaction of users with each of said complex systems in terms of the structured vocabulary explaining the abstract concepts;
   forming an initial functional requirements specification (FRS) which includes use cases,
   forming an amended requirements object model based on the initial FRS and thus in consideration of the initial set of use cases,
   forming additional use cases based on analysis of the amended requirements object model,
   changing the FRS in light of the additional use cases,
   forming another amended requirements object model based on the changed FRS simultaneously with the formation of the additional use cases,
   repeating the additional use case formation step, the FRS changing step and the amended requirements object model formation step until all desired use cases have been formed and considered, and
   obtaining a final requirements object model once all of the desired use cases have been considered,
   wherein since the additional use cases are formed simultaneously with the formation of the amended requirements object models, the amended requirements object models are thereby formed during the formation of the functional requirements specification, and
   wherein said method supports simultaneous development of several of the present members of said family of complex systems as well as later addition of the future members of the family of complex systems.

2. A method as claimed in claim 1, wherein the functional requirements specification (FRS) includes one or more chapters, further comprising:
   establishing one or more FRS authoring teams for separate chapters,
   designating a single object model control team to control internal consistency of the requirements object models,
   forming one or more overlapping modeling teams where each modeling team includes members of the object model control team together with one or more members of respective FRS authoring teams, and
   providing that overlapping modeling teams for their chapters construct use cases and provide respective portions of the structured vocabulary.

3. A method as claimed in claim 2, further comprising:
   constructing the initial requirements object model in at least one of the modeling teams,
   performing the FRS authoring of the use cases on the basis of the initial model, and
   performing fine tuning of the use cases by the object model control team.

4. A method as claimed in claim 2, further comprising carrying out FRS authoring of the use cases of several chapters in parallel by the respective FRS authoring teams.

5. A method as claimed in claim 1, wherein the differences between the members of the family are expressed in the requirements object models using one or more of the following mechanisms:
   specialization, wherein the differences between members of the family are expressed using subclasses of a generalized class,
   multiplicity, wherein the differences between members of the family are expressed using different multiplicities in relationships between classes, and
   attribution, wherein the differences between members of the family are expressed using different values for an attribute of a class.

6. A method as claimed in claim 1, wherein the complex systems are medical diagnostic imaging systems, notably, diagnostic x-ray examination systems.

7. A family of complex systems, notably a family of medical imaging systems, obtained by the method of claim 1, wherein separate complex systems support respective, different subsets of the use cases.

8. A method as claimed in claim 1, where the precise behavior of one or more use eases differs among members of the family according to variations expressed in the object model, notably by different subclasses of a general class, by different multiplicities of relationships, or by different values of attributes.

9. A method as claimed in claim 1, further comprising the step of expressing differences between the members of the family in the requirements object models using at least one of the following mechanisms:
   different members of the family are expressed using different subclasses of a generalized class,
   different members of the family are expressed using different multiplicities in relationships between classes, and
   different members of the family are expressed using different values for an attribute of a class.

10. A method as claimed in claim 1, further comprising analyzing the requirements object models to identify difficulties and shortcomings, the requirements object models being amended in light of the identified difficulties and shortcomings.

11. A method as claimed in claim 1, further comprising considering the functional requirements specification complete when all of the use cases are expressed in the structured vocabulary of the final requirements object model.

12. A method as claimed in claim 1, wherein the use cases are formed using only the structured vocabulary of the requirements object models.

13. A method as claimed in claim 1, wherein formation of the amended requirements object models comprises changing the structured vocabulary.

14. A method as claimed in claim 1, wherein the use cases are expressed in natural language.

* * * * *